US012590593B2

(12) United States Patent
Ferrarini

(10) Patent No.: US 12,590,593 B2
(45) Date of Patent: Mar. 31, 2026

(54) PRESSURE MULTIPLIER

(71) Applicant: CAMOZZI AUTOMATION S.P.A., Brescia (IT)

(72) Inventor: Dario Ferrarini, Brescia (IT)

(73) Assignee: CAMOZZI AUTOMATION S.P.A., Brescia (IT)

( * ) Notice: Subject to any disclaimer, the term of this patent is extended or adjusted under 35 U.S.C. 154(b) by 77 days.

(21) Appl. No.: 18/565,123

(22) PCT Filed: Apr. 15, 2022

(86) PCT No.: PCT/IB2022/053560
§ 371 (c)(1),
(2) Date: Nov. 29, 2023

(87) PCT Pub. No.: WO2022/254262
PCT Pub. Date: Dec. 18, 2022

(65) Prior Publication Data
US 2024/0240652 A1 Jul. 18, 2024

(30) Foreign Application Priority Data
Jun. 4, 2021 (IT) ........................ 102021000014633

(51) Int. Cl.
*F15B 3/00* (2006.01)

(52) U.S. Cl.
CPC ........... *F15B 3/00* (2013.01); *F15B 2211/214* (2013.01); *F15B 2211/327* (2013.01)

(58) Field of Classification Search
None
See application file for complete search history.

(56) References Cited

U.S. PATENT DOCUMENTS 3,114,378 A * 12/1963 Lockman ................ F15B 21/00 137/86
3,590,688 A * 7/1971 Brannon ............. F15B 13/0417 91/532
4,927,335 A * 5/1990 Pensa .................... F04B 49/022 417/393

(Continued)

FOREIGN PATENT DOCUMENTS

CN 100540894 C * 9/2009 ............ F04B 35/045
CN 108425895 A 8/2018

(Continued)

OTHER PUBLICATIONS

Translation CN-100540894 Biscaldi (USPTO Search) (Year: 2025).*

(Continued)

*Primary Examiner* — Dominick L Plakkoottam
*Assistant Examiner* — Geoffrey S Lee
(74) *Attorney, Agent, or Firm* — ArentFox Schiff LLP; Michael Fainberg

(57) ABSTRACT

A pressure multiplier having a cylinder assembly, a command device, and an electronic control unit is provided. The electronic control unit is configured to obtain a switching signal to be provided to the command device from a compression curve which, knowing pressure of a fluid entering the pressure multiplier, binds a pressure increase of the fluid exiting the pressure multiplier with a switching frequency of a piston of the cylinder assembly.

8 Claims, 10 Drawing Sheets

(56) References Cited

U.S. PATENT DOCUMENTS

| | | | | | |
|---|---|---|---|---|---|
| 5,238,372 | A * | 8/1993 | Morris | F01L 25/06 417/393 |
| 5,558,506 | A * | 9/1996 | Simmons | F01L 25/066 417/393 |
| 5,893,707 | A * | 4/1999 | Simmons | F04B 9/135 417/393 |
| 6,039,326 | A * | 3/2000 | Agner | B60G 17/0162 280/5.506 |
| 6,158,967 | A * | 12/2000 | Dupre | F04B 9/1372 277/300 |
| 6,454,542 | B1 * | 9/2002 | Back | F04B 15/02 91/275 |
| 6,457,307 | B1 * | 10/2002 | Feldman | F03B 13/148 417/330 |
| 6,478,552 | B1 * | 11/2002 | Batten | F04B 9/135 417/403 |
| 7,175,395 | B1 * | 2/2007 | Forest | F04B 9/115 417/393 |
| 7,257,940 | B1 * | 8/2007 | Knight | F02K 9/50 60/257 |
| 9,816,497 | B2 * | 11/2017 | Strickland | F04B 25/04 |
| 10,359,032 | B2 * | 7/2019 | Strickland | F04B 9/1095 |
| 10,731,636 | B2 * | 8/2020 | Strickland | F04B 9/1095 |
| 11,111,907 | B1 * | 9/2021 | Sahm | F04B 49/22 |
| 11,519,402 | B2 * | 12/2022 | Burrows | F04B 39/1046 |
| 2010/0089063 | A1 * | 4/2010 | McBride | F15B 21/14 60/682 |
| 2010/0158717 | A1 * | 6/2010 | Vogt | F04B 35/004 417/401 |
| 2014/0219830 | A1 * | 8/2014 | Strickland | F04B 9/1095 417/212 |
| 2014/0260948 | A1 * | 9/2014 | Cherepashenets | F15B 15/02 91/358 R |
| 2016/0138393 | A1 * | 5/2016 | Kyllingstad | G01N 33/2823 73/152.04 |
| 2018/0066640 | A1 * | 3/2018 | Strickland | F04B 25/02 |
| 2019/0345922 | A1 * | 11/2019 | Strickland | F04B 9/1095 |
| 2019/0383279 | A1 * | 12/2019 | Simmons | F04B 11/005 |
| 2020/0332781 | A1 * | 10/2020 | Prigent | F04B 1/02 |
| 2021/0381451 | A1 * | 12/2021 | Rollinger | F02B 21/00 |

FOREIGN PATENT DOCUMENTS

| | | | |
|---|---|---|---|
| CN | 110541853 | A | 12/2019 |
| DE | 29818762 | U1 | 12/1998 |
| EP | 3546762 | A1 | 10/2019 |
| JP | S58193101 | U | 12/1983 |
| JP | 2010282243 | A * | 12/2010 |
| WO | 2018186048 | A1 | 10/2018 |

OTHER PUBLICATIONS

Translation JP-2010282243 Saito (USPTO Search) (Year: 2025).*
International Search Report, issued in PCT/IB2022/053560, mailed Jul. 20, 2022, Rijswijk, NL.

* cited by examiner

PRESSURE MULTIPLIER

CROSS-REFERENCE TO RELATED APPLICATIONS

This application is a National Phase Application of PCT International Application No. PCT/IB2022/053560, having an International Filing Date of Apr. 15, 2022 which claims priority to Italian Application No. 102021000014633 filed Jun. 4, 2021, each of which is hereby incorporated by reference in its entirety.

FIELD OF THE INVENTION

The present invention relates to a pressure multiplier (also known in English technical jargon as a "booster").

BACKGROUND OF THE INVENTION

As is well known, a pressure multiplier is a device that is used to increase the pressure of a fluid, typically air, that it receives at the inlet (already compressed to various values) and to bring it to the outlet at an increased pressure value, typically at a double compression value.

Air compression occurs through the oscillatory motion of two pistons placed inside two chambers of a cylinder.

Multipliers are mainly mechanical, i.e. the oscillation of the two pistons is obtained by means of two limit switches that allow the exchange of the incoming air between the two compression chambers.

These mechanical pressure multipliers are not without their drawbacks.

For example, said pressure multipliers are subject to a phenomenon called "stall," which occurs when, for mechanical reasons typically related to friction, a piston is unable to reach and engage the limit switch, making it unable to switch the chamber and then continue oscillation and consequently compression.

Another drawback is related to the installation position. Some devices on the market require a well determined installation position, otherwise the presence of inertia and friction could compromise the operation.

Further, inlet or outlet (or integrated) pressure regulators are required.

In order to overcome at least in part these drawbacks, electronic pressure multipliers have been proposed, i.e., those in which the switching of the pistons takes place without mechanical contact with the limit switches inside the cylinder, but rather with magnetic field sensors positioned on the outer wall of the cylinder and suitable to detect that a limit switch position has been reached through the presence of a magnet on at least one of the two pistons.

An example of this type of pressure multiplier is described in EP3546762A1.

SUMMARY OF THE INVENTION

The object of the present invention is to propose a pressure multiplier which overcomes the limitations of mechanical pressure multipliers and at the same time has a simplified structure, in particular, not requiring magnetic pistons and limit switch sensors.

Said object is achieved by a pressure multiplier as described and claimed herein. Preferred embodiments of the present invention are also described.

BRIEF DESCRIPTION OF THE FIGURES

The features and the advantages of the pressure multiplier according to the invention shall be made readily apparent from the following description of preferred embodiments thereof, provided purely by way of non limiting example, with reference to the accompanying figures, wherein.

DETAILED DESCRIPTION

Figure 1:
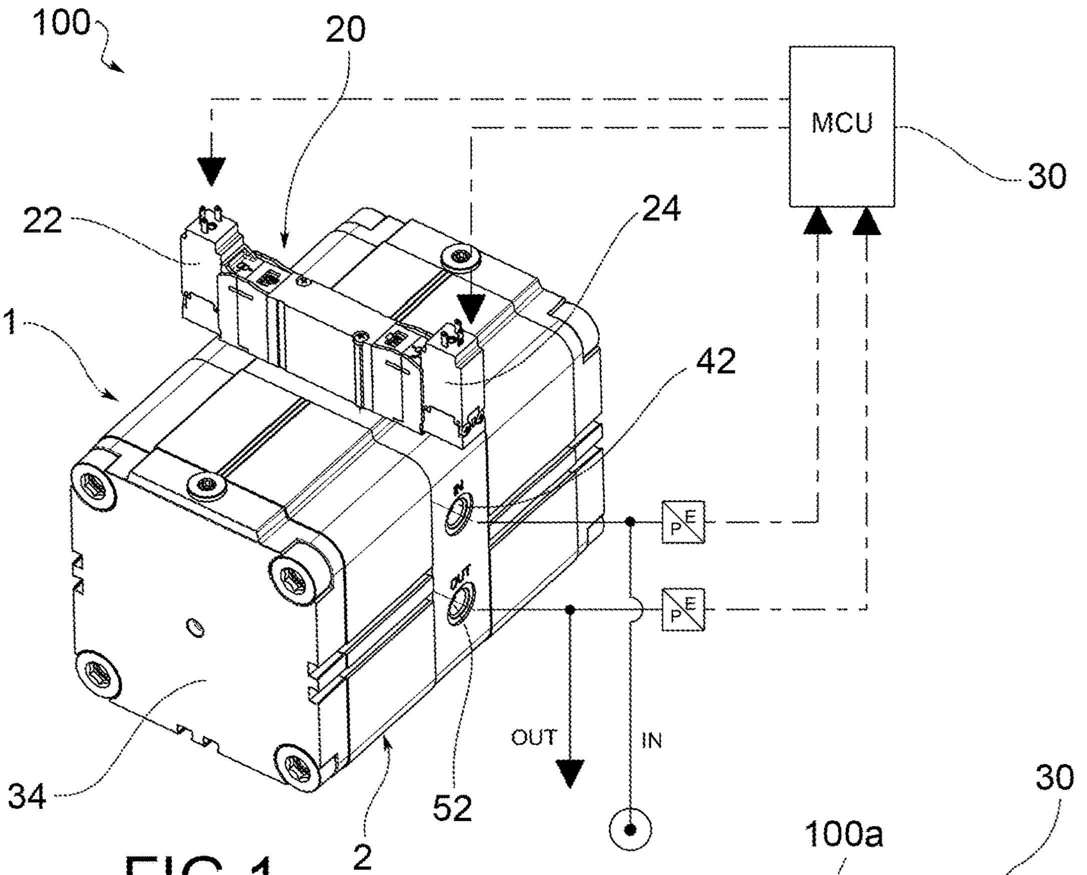
FIGS. 1 and 1*a* are a perspective view of the pressure multiplier, in a first embodiment with a spool control valve of a bistable type, and in a second embodiment with a spool control valve of a monostable type, respectively.
Figure 1A:
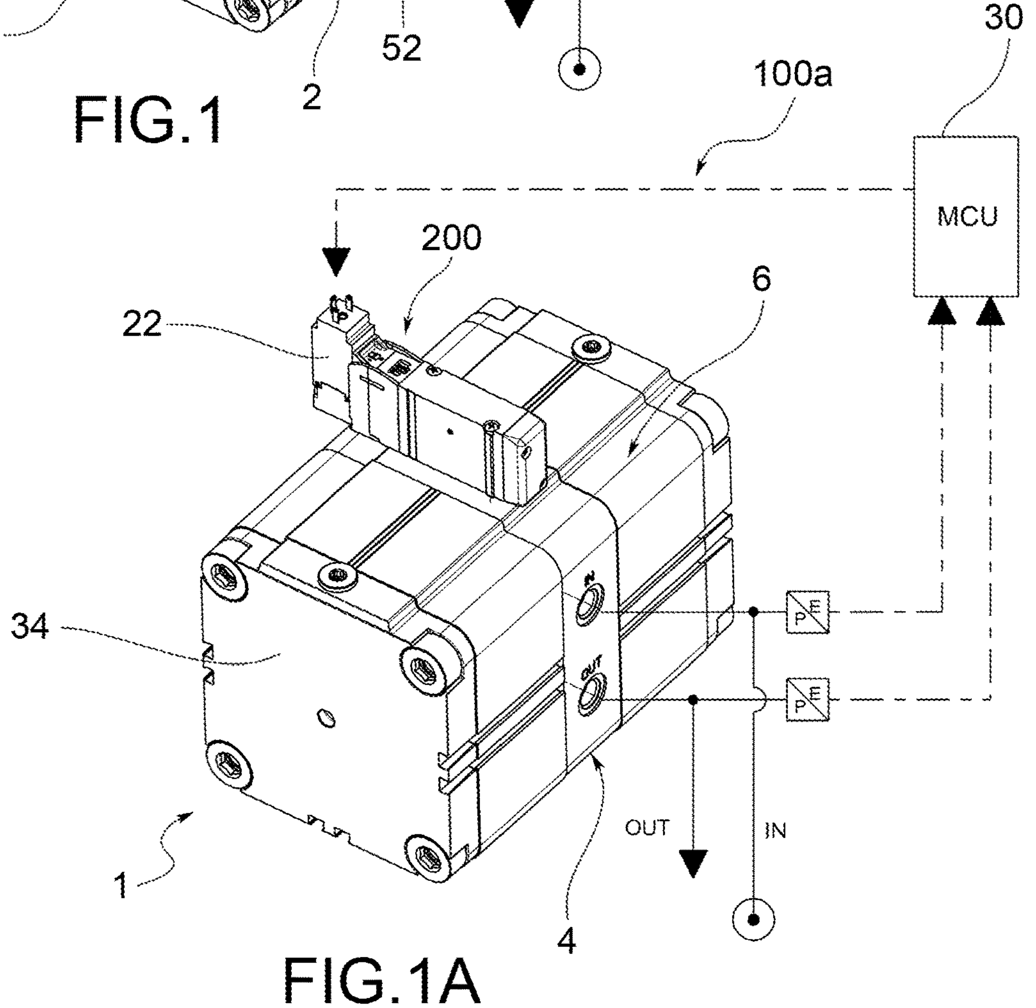
Figure 2:
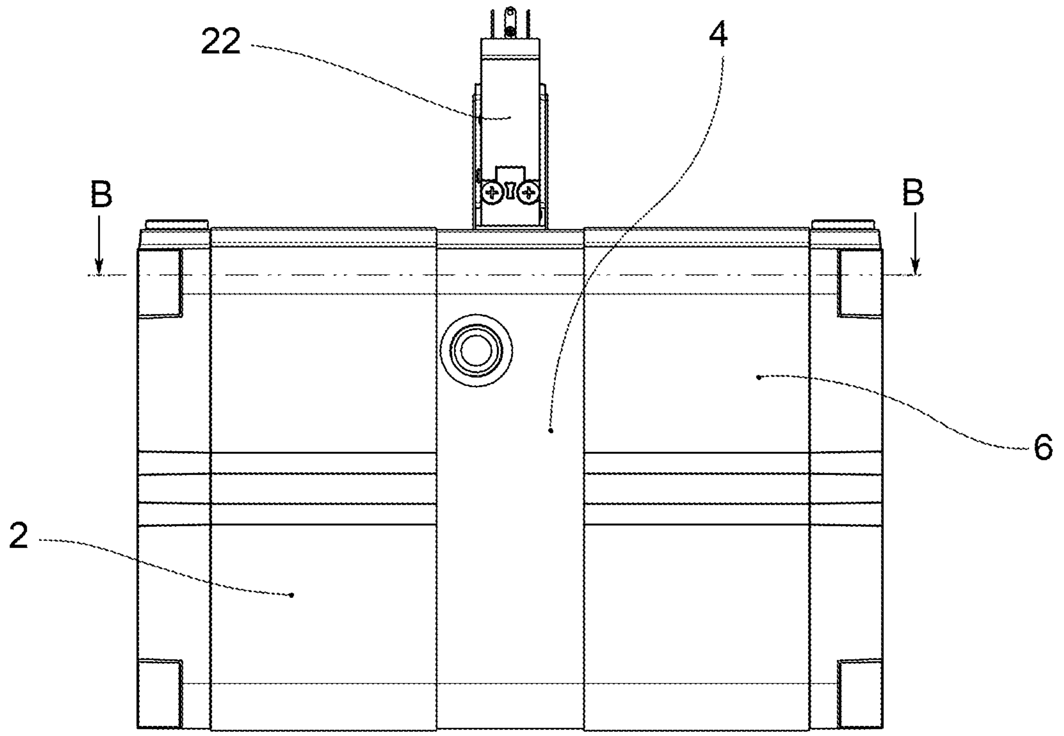
FIG. 2 is a side view of the pressure multiplier in FIG. 1.
Figure 3:
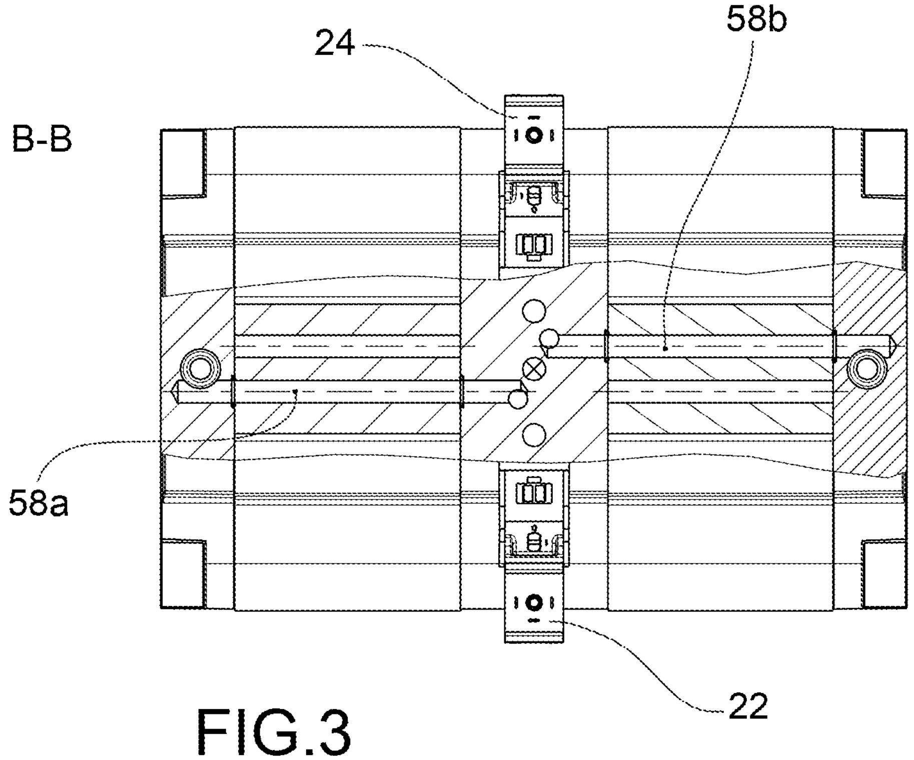
FIG. 3 is a view in cross section of the pressure multiplier along the horizontal plane identified by the line B-B in FIG. 2.

In said drawings, 100; 100*a* has been used to indicate a pressure multiplier according to the invention as a whole.

In a general embodiment, the pressure multiplier 100; 100*a* includes a tandem-type cylinder assembly 1 extending along a multiplier axis X. The cylinder assembly comprises a first cylinder 2, a central body 4, and a second cylinder 6. The first cylinder 2, the central body 4, and the second cylinder 6 are aligned along the multiplier axis X. The first cylinder 2 has one end adjacent to the central body 4, which is adjacent to one end of the second cylinder 6.

In one embodiment, the outer surfaces of the first cylinder 2, of the central body 4, and of the second cylinder 6 are substantially aligned, i.e., flush with each other, such that the cylinder assembly exhibits a substantially continuous outer surface.

The pressure multiplier 100; 100*a* further comprises a command device 20; 200 that controls the fluid supply to the cylinder assembly 1 as will be described below.

In the illustrated embodiment, the command device 20; 200 is an electrically actuated spool valve.

In the embodiment of FIGS. 1, 2, 3, 4, 5, 6 and 7, the spool valve 20 is a 5-way, two-position (5/2) valve of the bistable type, that is, in which the switching between the two positions occurs by activating two pilot solenoid valves 22, 24.

In the embodiment of FIGS. 1*a*, 5*a*, 6*a* and 7*a*, the spool valve 200 is a 5-way, two-position (5/2) valve of the monostable type, that is, in which the switching between the two positions occurs by activating a pilot solenoid valve 22 and a spring 204.

The command device 20; 200 is operatively connected to an electronic control unit 30 ("MCU," "master control unit"). The electronic control unit 30 may be external with respect to the cylinder assembly 1 and the command device 20; 200, such as a PLC or a PC, or may be implemented as an electronic component integrated or integral with the cylinder assembly 1.

The electronic control unit 30 commands, for example, the activation and deactivation of the pilot solenoid valves 22, 24.

The command device 20; 200 is supplied by a pressurized fluid source 32.

Figure 4:
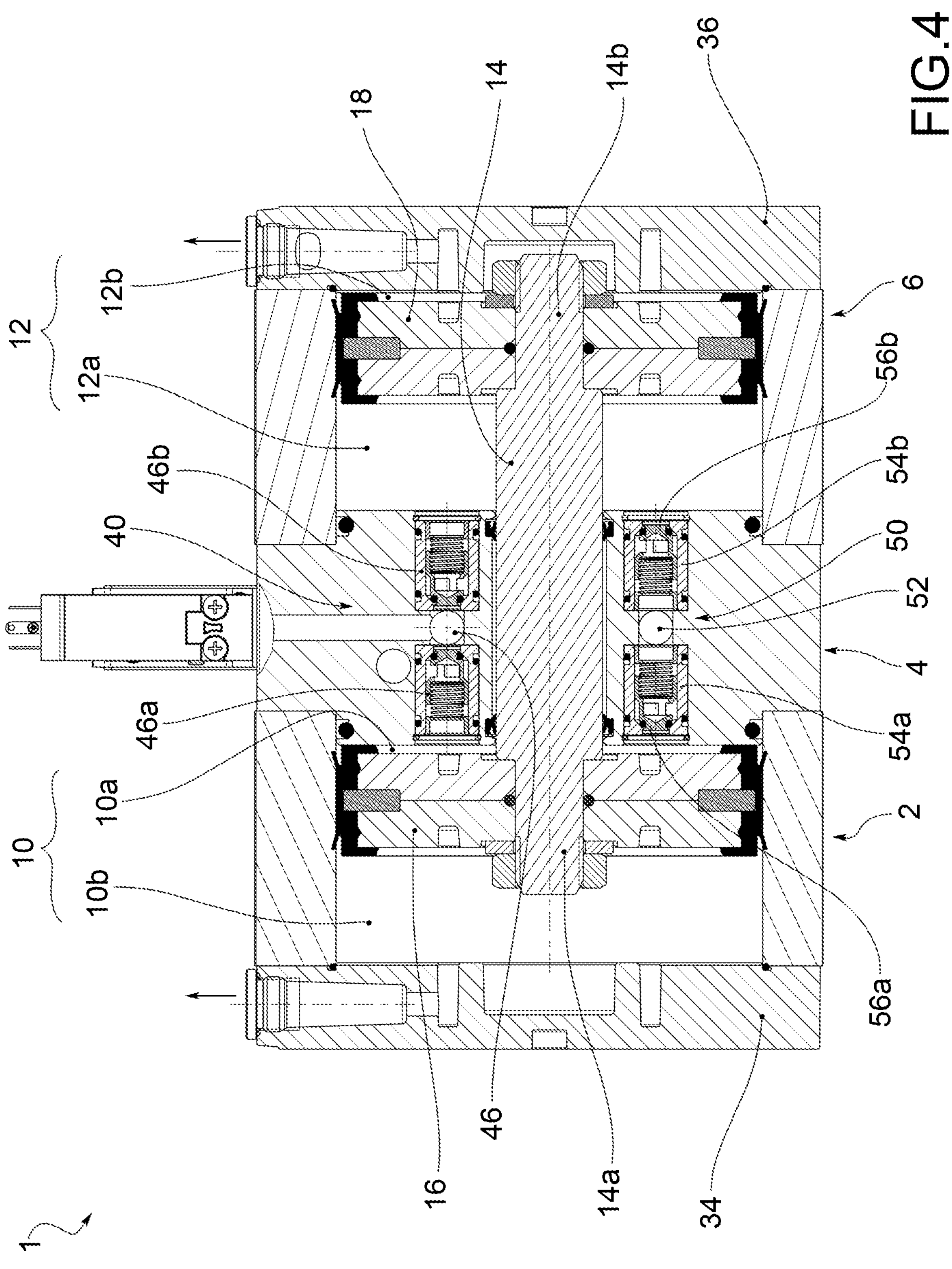
FIG. 4 is an axial cross section of the pressure multiplier.
Figure 5:
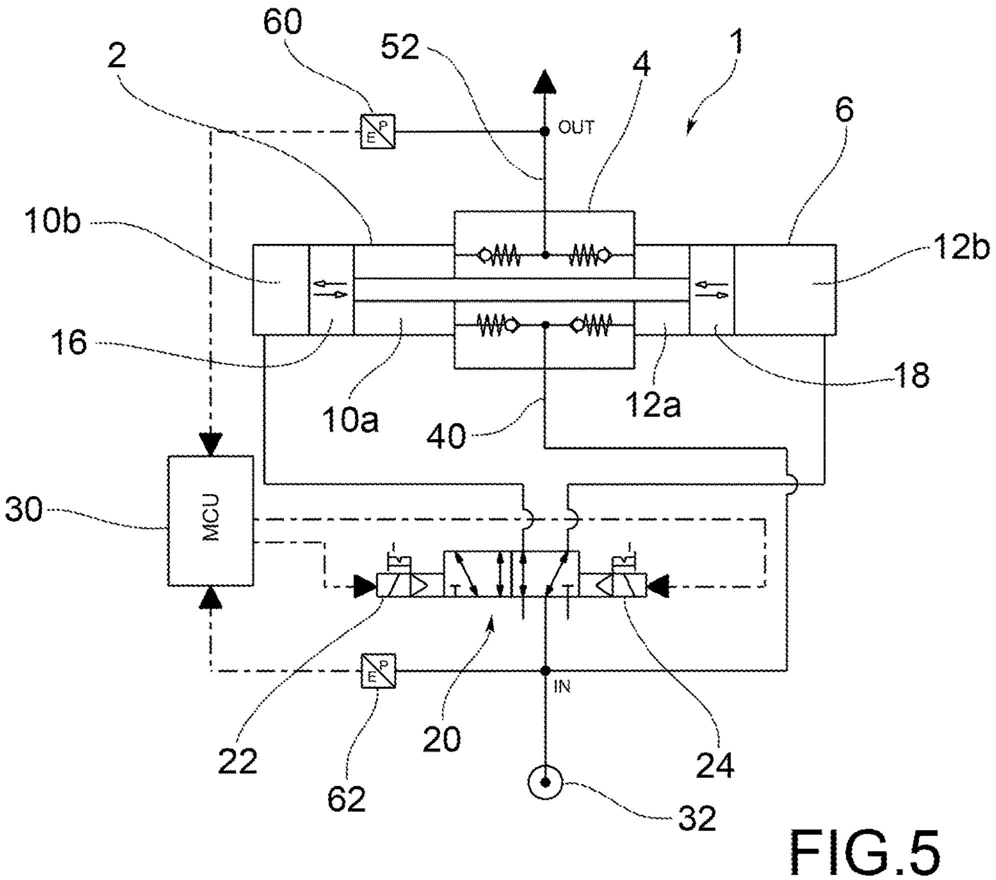
FIGS. 5 and 5*a* are representations of the pressure multipliers of FIGS. 1 and 1*a* in the form of pneumatic circuits, respectively.
Figure 5A:
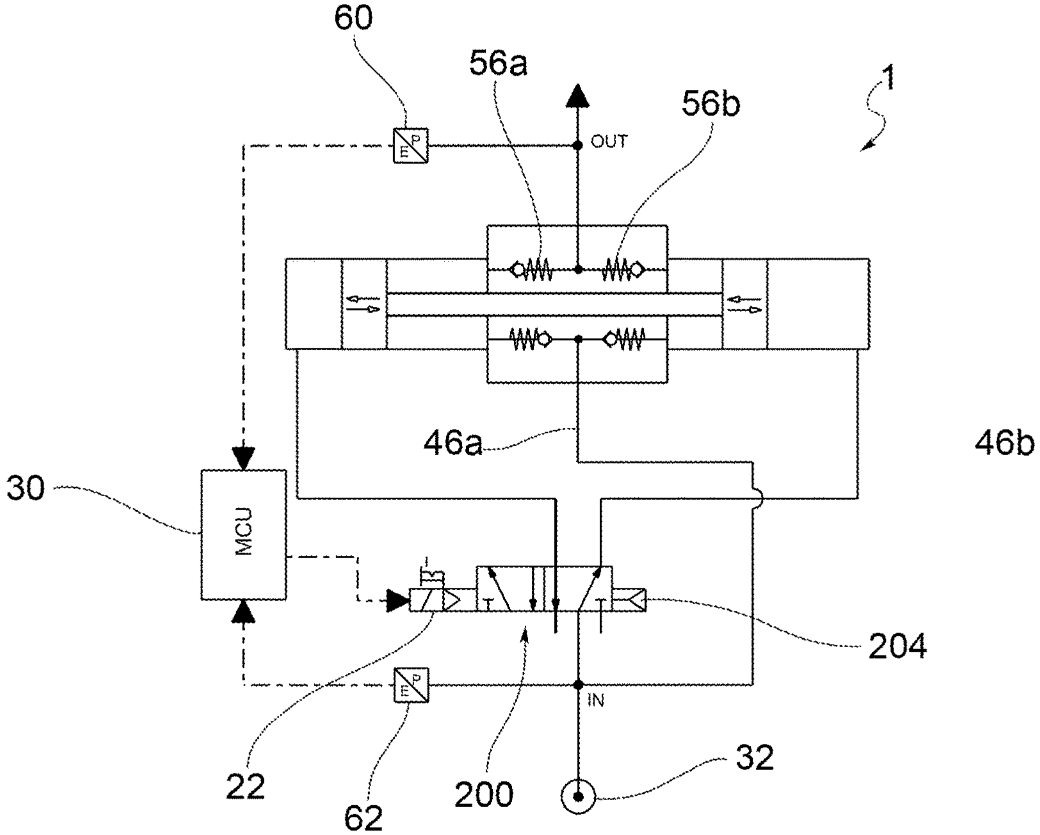

As shown in FIG. 4, a first chamber 10 is formed within the first cylinder 2, while a second chamber 12 is formed within the second cylinder 6.

The first cylinder 2 is closed by a first header 34 at the opposite end from the central body 4. Thus, the first chamber 10 is axially delimited by the first header 34 and by the central body 4.

The second cylinder 6 is closed by a second header 36 at the opposite end from the central body 4. Therefore, the second chamber 12 is axially delimited by the second header 36 and by the central body 4.

Within the cylinder assembly 1, a rod 14 extends, coaxially to the main axis X.

The rod 14 passes through the central body 4 and has two opposite rod ends 14*a*, 14*b* that penetrate the first chamber 10 and the second chamber 12, respectively.

In the first chamber 10, a first piston 16 is connected to the first rod end 14*a*. Thus, the first chamber 10 is divided into a first pressure increase chamber 10*a*, adjacent to the central body 4, and a first actuation chamber 10*b*, adjacent to the first header 34.

In the second chamber 12, a second piston 18 is connected to the second rod end 14*b*. Thus, the second chamber 12 is divided into a second pressure increase chamber 12*a*, adjacent to the central body 4, and a second actuation chamber 12*b*, adjacent to the second header 36.

The first piston 16 is axially movable (i.e., along the major axis X) within the first chamber 10 between the central body 4 and the first header 34. The second piston 18 is axially movable within the second chamber 12 between the central body 4 and the second header 36.

A fluid supply circuit 40, having an inlet port 42 suitable to be connected to the pressurized fluid source 32, is formed in the central body 4. This supply circuit 40 supplies the pressurized fluid to at least one of the first pressure increase chamber 10*a* and the second pressure increase chamber 12*a*.

The supply circuit 40 comprises an inlet passage 46 that communicates with the inlet port 42 and is divided into a first supply passage 46*a* through which the inlet passage 46 communicates with the first pressure increase chamber 10*a*, and a second supply passage 46*b* through which the inlet passage 46 communicates with the second pressure increase chamber 12*a*.

In one embodiment, a first one-way inlet valve 48*a* is provided in the first supply passage 46*a*, allowing fluid to be supplied from the inlet port 42 to the first pressure increase chamber 10*a*, while preventing the fluid from flowing back from the first pressure increase chamber 10*a*.

A second one-way inlet valve 48*b* is provided in the second supply passage 46*b*, which allows fluid to be supplied from the inlet port 42 to the second pressure increase chamber 12*a*, while preventing the fluid from flowing back from the second pressure increase chamber 12*a*.

A fluid outlet circuit 50 terminating in an outlet port 52 is also provided in the central body 4, suitable to supply the fluid of which the pressure has been increased in the first pressure increase chamber 10*a* or the second pressure increase chamber 12*a* to the outside.

The fluid outlet circuit 50 comprises a first outlet passage 54*a*, through which the first pressure increase chamber 10*a* communicates with the outlet port 52, the outlet port 54, and a second outlet passage 54*b*, through which the second pressure increase chamber 12*a* communicates with the outlet port 52.

In one embodiment, a first one-way outlet valve 56*a* is provided in the first outlet passage 54*a* to allow fluid to flow out of the first pressure increase chamber 10*a* to the outlet port 52, while preventing fluid from flowing back from the outlet port 52 to the first pressure increase chamber 10*a*.

A second one-way outlet valve 56*b* is provided in the second outlet passage 54*b*, allowing fluid to flow out of the second pressure increase chamber 12*a* to the outlet port 52, while preventing fluid from flowing back from the outlet port 52 to the second pressure increase chamber 12*a*.

As shown in FIG. 4, the fluid supply circuit 40 further includes a first actuation passage 58*a*, fluidly connecting the first actuation chamber 10*b* with a first outlet 20*a* of the command device 20; 200, and a second actuation passage 58*b*, fluidly connecting the second actuation chamber 12*b* with a second outlet 20*b* of the command device 20; 200.

In an embodiment in which the command device 20; 200 is a spool valve mounted on the central body 4, the first and second actuation passages 58*a*, 58*b* are formed within a peripheral portion of the central body 2 and in a side wall of the first cylinder 2 and the second cylinder 6, respectively.

When the command device 20; 200 receives a switching signal from the electronic control unit 30 that causes the command device 20; 200 to switch, for example by excitation of the first pilot solenoid valve 22, such that the first outlet opening 20*a* is in fluid connection with the pressurized fluid source 32, while the second outlet opening 20*b* is connected to a discharge duct, the fluid is supplied from the command device 20; 200 to the first actuation chamber 10*b* through the first actuation passage 58*a*, while fluid within the second actuation chamber 12*b* is discharged to the outside through the second actuation passage 58*b*. Consequently, the first piston 16, the rod 14, and the second piston 18 are displaced toward the second actuation chamber 12*b* by the fluid pressure supplied to the first actuation chamber 10*b*.

Conversely, when the command device 20; 200 receives a switching signal from the electronic control unit 30 that causes the command device 20; 200 to switch, for example by excitation of the second pilot solenoid valve 24 (in the case of a bistable valve) and by de-energizing the first pilot solenoid valve 22, such that the second outlet opening 20*b* is in fluid connection with the pressurized fluid source 32 while the first outlet opening 20*b* is connected to a discharge duct, fluid is supplied from the command device 20; 200 to the second actuation chamber 12*b* via the second actuation passage 58*b*, while the fluid within the first actuation chamber 10*b* is discharged to the outside via the first actuation passage 58*a*. Consequently, the first piston 16, the rod 14, and the second piston 18 are displaced toward the first actuation chamber 10*b* by the fluid pressure supplied to the second actuation chamber 12*b*.

In one embodiment, the pressure multiplier 100; 100*a* further comprises an outlet pressure sensor 60 suitable to measure the pressure of the fluid exiting the outlet circuit 50 of the pressure multiplier and an inlet pressure sensor 62 suitable to measure the pressure of the fluid supplied by the pressurized fluid source 32.

The electronic control unit 30 receives outlet and inlet fluid pressure values from the outlet pressure sensors 60 and inlet pressure sensors 62.

By means of experimental tests carried out on a pressure multiplier, or by means of digital fluid dynamic simulations of the pneumatic circuit of the pressure multiplier and the command device, e.g., using concentrated parameter models, it is possible to determine compression curves that link the pressure increase of the exiting fluid with respect to an inlet pressure as a function of the oscillation frequency of the pistons.

In other words, a close relationship may be established between the inlet pressure, increase of the outlet pressure, and oscillation of the piston.

According to an aspect of the invention, the electronic control unit 30 is configured to access compression curves obtained, as a function of different inlet pressures, from tests performed on a cylinder assembly and command device identical to those controlled by the electronic control unit 30 or from digital fluid dynamic simulations based on the same physical and geometric features of the cylinder assembly and command device controlled by the electronic control unit 30.

Therefore, knowing the pressure of the inlet fluid, measured, for example, by the inlet pressure sensor 62, and detecting the pressure of the outlet fluid over time, for example measured by the outlet pressure sensor 60, unit the electronic control 30 acquires from the compression curve the value of the switching frequency of the pistons of the pressure multiplier and translates this value into an on/off switching command of the command device 20; 200.

In some embodiments, the physical and geometric features taken into account to perform fluid dynamic simulations are at least some among: diameter of the piston rod 14, piston stroke 16, 18, total moving mass of the pistons, piston diameter, initial pressure in volumes and ducts, internal diameter of the supply duct of the cylinder assembly, diameter of the internal ducts between command device and chambers of the cylinder assembly, diameter of the discharge duct of the cylinder assembly, effective air passage diameter of the one-way valves.

In some embodiments, at least some of the following physical and geometric features are also employed: mass of the cylinder liner, length of the ducts between the command device and the chambers of the cylinder assembly, length of the supply duct of the cylinder assembly, dead volume between pistons and respective cylinder headers of the cylinder assembly, dead volume between pistons and the central body, spool valve stroke, minimum pressure differential at which the one-way valves begin to open, maximum pressure differential at which the one-way valves are fully open, first detachment friction force, speed at which viscous friction takes over, minimum dynamic friction, viscous friction coefficient.

Preferably, for the modeling of the pneumatic circuit of the pressure multiplier, the features of the circuit downstream of the cylinder assembly are also considered, in particular the volume of the tank to be filled, the inner diameter and length of the duct connecting the cylinder assembly and the tank to be filled.

Figure 8:
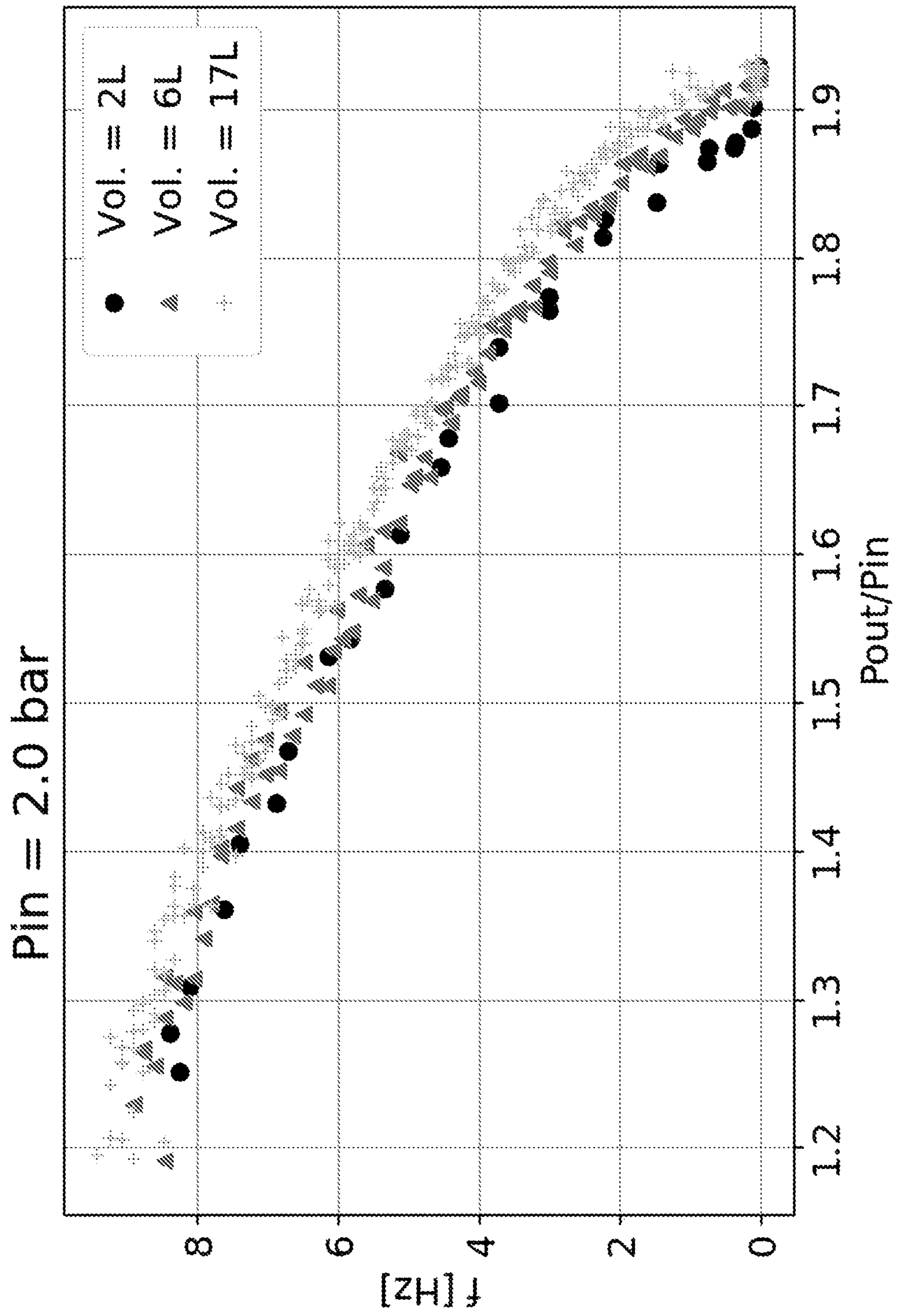
FIG. 8-8*c* show some examples of compression curves.
Figure 8A:
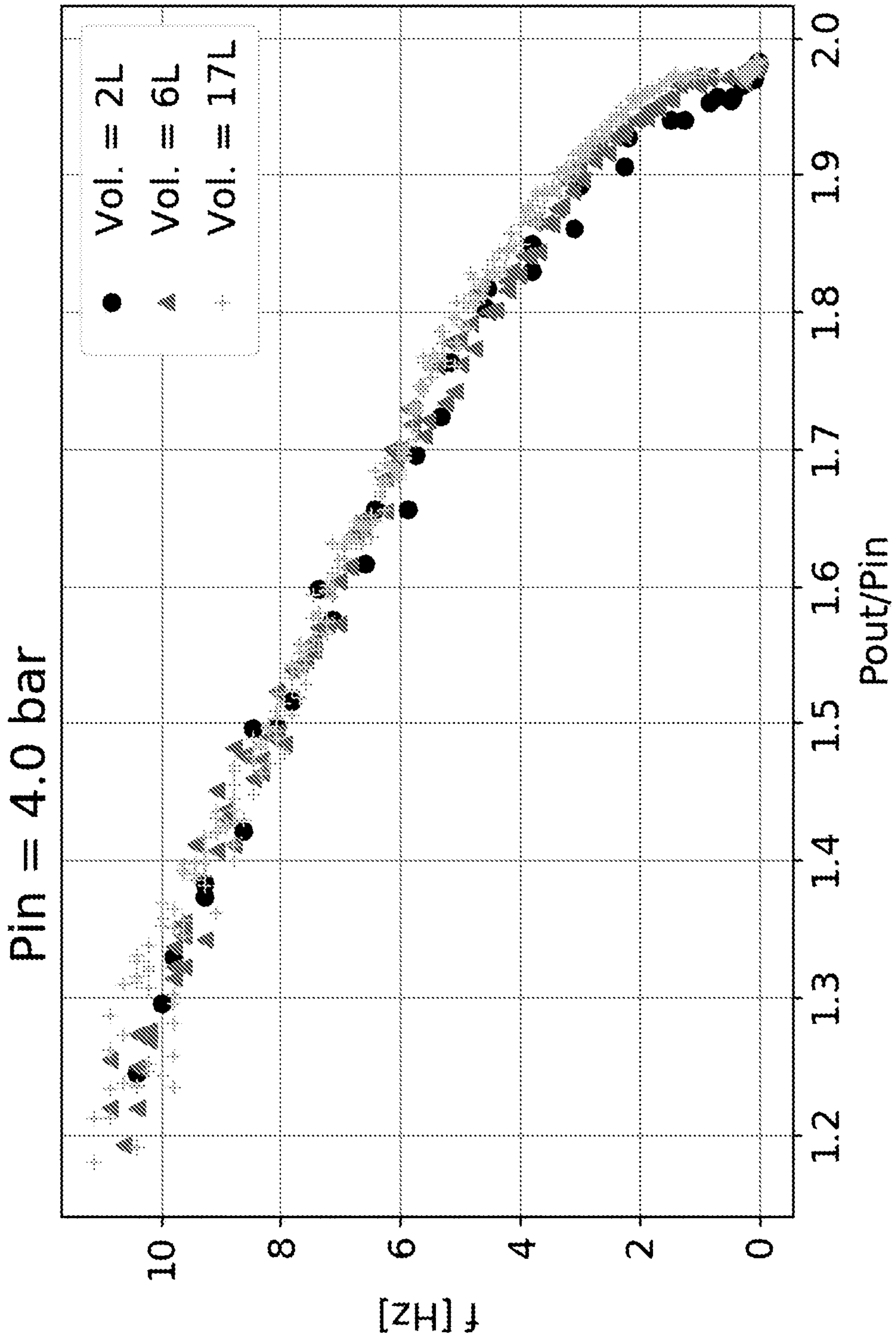
Figure 8B:
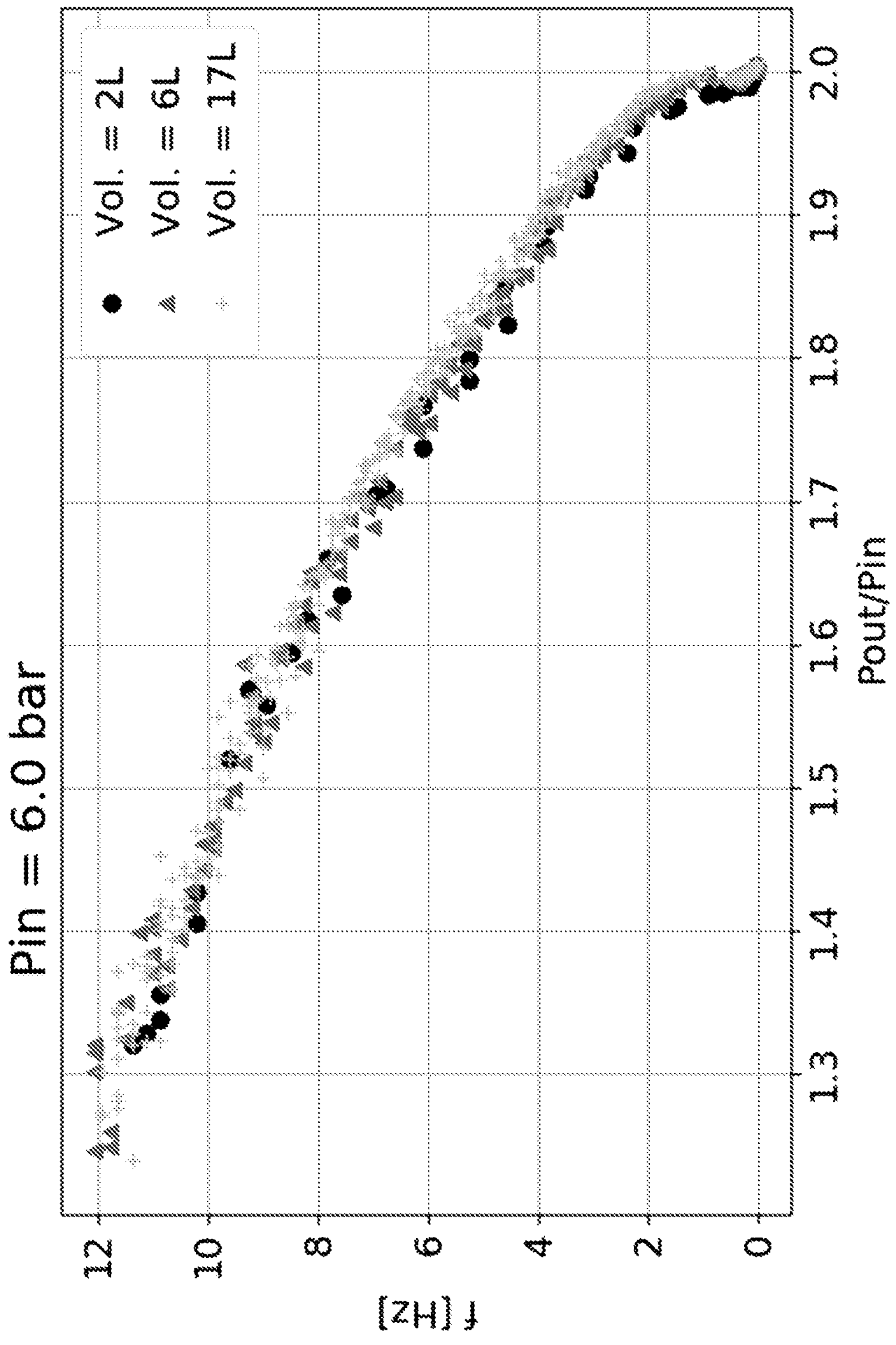
Figure 8C:
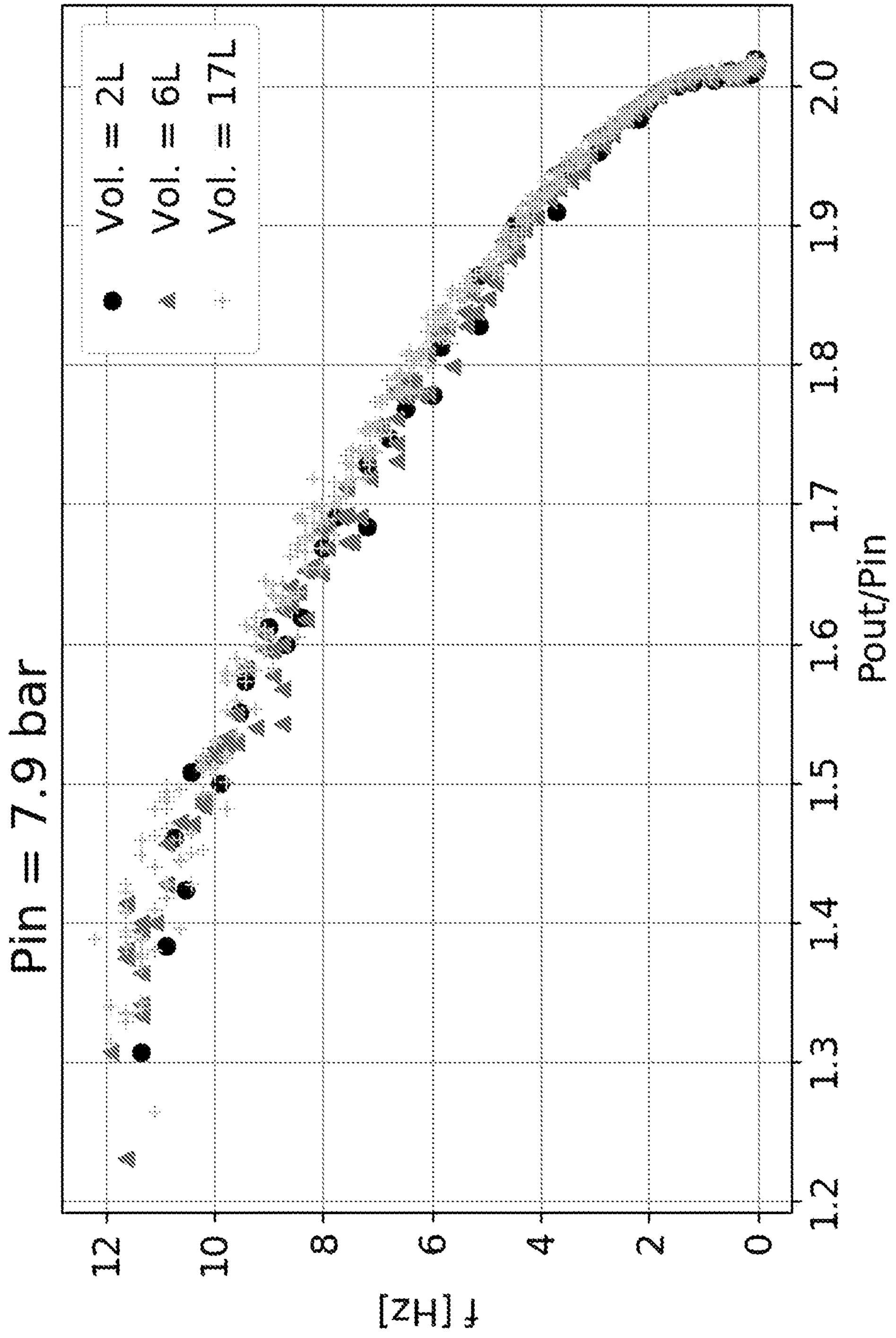

The FIG. 8-8*c* show as many examples of these compression curves used by the electronic control unit to control the command device. In these curves, the trend of the switching frequency of the cylinder assembly (y-axis) is represented as a function of the ratio between the outlet pressure (Pout) and the inlet pressure (Pin). Each graph shows three curves, relating to three different volumes of a tank to be filled (e.g., 21, 61 and 171).

As may be seen, the three curves in each of the graphs are substantially overlapping with each other. Therefore, it may be assumed that the trend of the switching frequency of the cylinder assembly as a function of the ratio of the outlet pressure (Pout) to the inlet pressure (Pin) is independent of the volume of the tank to be filled.

The information of the volume of the tank to be filled may be used in an initial calibration phase of the mathematical models and/or for the experimental tests that allow the compression curves to be constructed.

FIG. 8 represents the three curves with an inlet pressure Pin of 2.0 bar; FIG. 8*a* represents the three curves with an inlet pressure Pin of 4.0 bar; FIG. 8*b* represents the three curves with an inlet pressure Pin of 6.0 bar; FIG. 8*c* represents the three curves with an inlet pressure Pin of 7.9 bar.

The operation of the pressure multiplier according to the invention will now be described.

Figure 7:
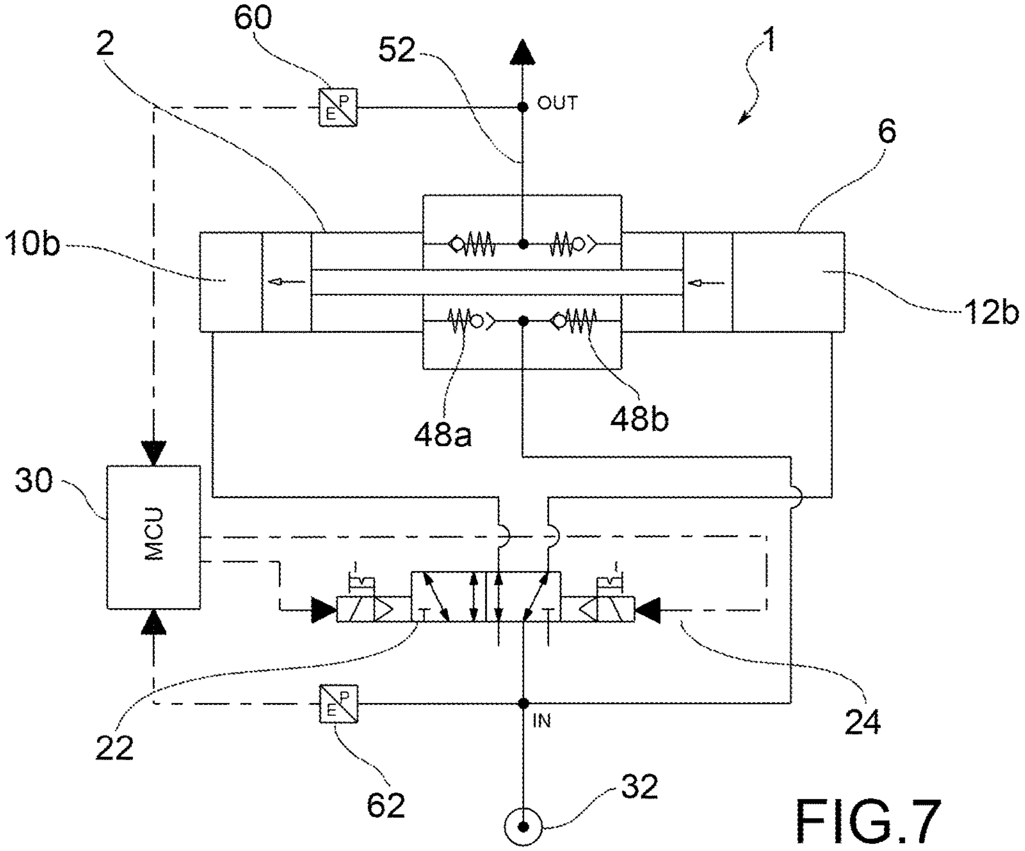
FIGS. 7 and 7*a* show the pneumatic circuits in FIGS. 5 and 5*a* configured to move the multiplier pistons from right to left.
Figure 7A:
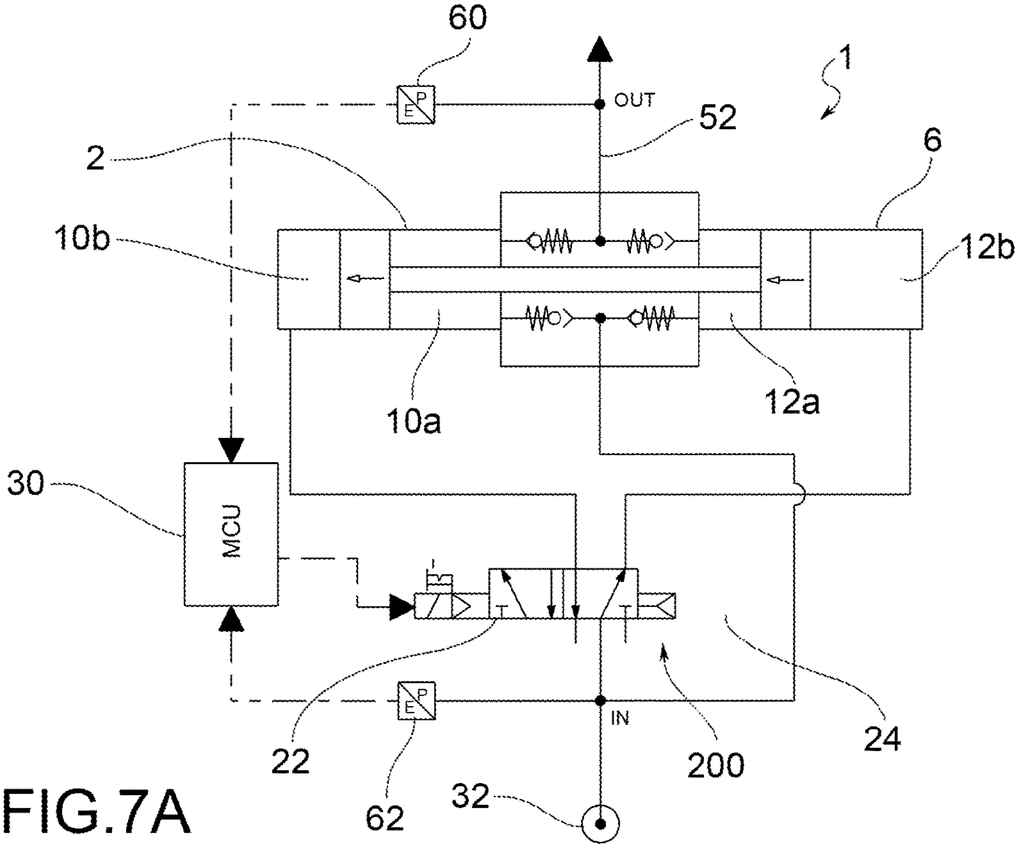

It is initially assumed that the pressure multiplier is in the position shown in FIGS. 4, 7, and 7*a*, i.e., with the pistons to be moved from right to left. In this case, the fluid supplied to the second pressure increase chamber 12*a* undergoes a pressure increase causing the first piston 16 and the second piston 18 to be displaced in the right-to-left direction.

In this starting configuration, for example, the first piston 16 is positioned within the first chamber 10 and is separated by a slight gap from the central body 4. The second piston 18 is located within the second chamber 12 and is separated by a slight gap from the second header 36.

The fluid supplied by the pressurized fluid source 32 is supplied from the inlet passage 46 to the inlet circuit 40. The inlet circuit 40 supplies fluid to the first pressure increase chamber 10*a* through the first supply passage 46*a*. It should be noted that in the second pressure increase chamber 12*a* the fluid is already present, having been introduced during the previous switchover.

At this instant, the electronic control unit 30 sends a switching signal to the command device 20; 200, e.g., an excitation signal of the second pilot solenoid valve 24 (FIG. 7).

Following switching of the command device 20; 200, fluid from the pressurized fluid source 32 is supplied to the second actuation chamber 12*b*. The pressurized fluid then acts on the second piston 18.

The first actuation chamber 10*b* is instead arranged to discharge, for example, through the command device 20; 200.

Because of the fluid supplied to the first pressure increase chamber 10*a*, the pressurized fluid also acts on the first piston 16.

In this manner, fluid is supplied to the first pressure increase chamber 10*a* and the second acuation chamber 12*b*, while being discharged from the first actuation chamber 10*b*. Therefore, the first piston 16, the piston rod 14, and the second piston 18 are displaced integrally in the right-to-left direction.

The fluid within the second pressure increase chamber 12*a* is then compressed due to the displacement of the second piston 18 and its pressure increases. In the second pressure increase chamber 12*a*, the pressure of the fluid may be increased to a pressure value that is at most twice that of the original pressure.

The fluid, after undergoing the pressure increase, is emitted to the outside through the second outlet passage 54*b* and the outlet port 52 of the fluid outlet circuit 50.

Figure 6:
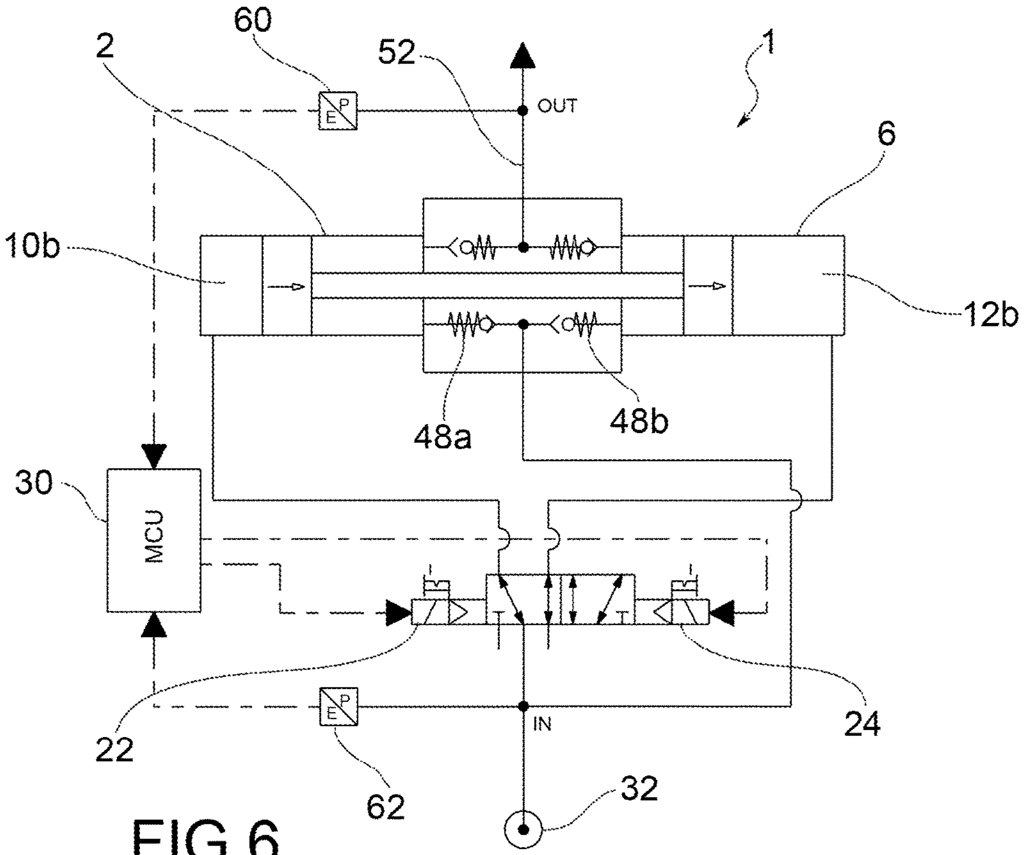
FIGS. 6 and 6*a* show the pneumatic circuits in FIGS. 5 and 5*a* configured to move the pistons of the multiplier from left to right.
Figure 6A:
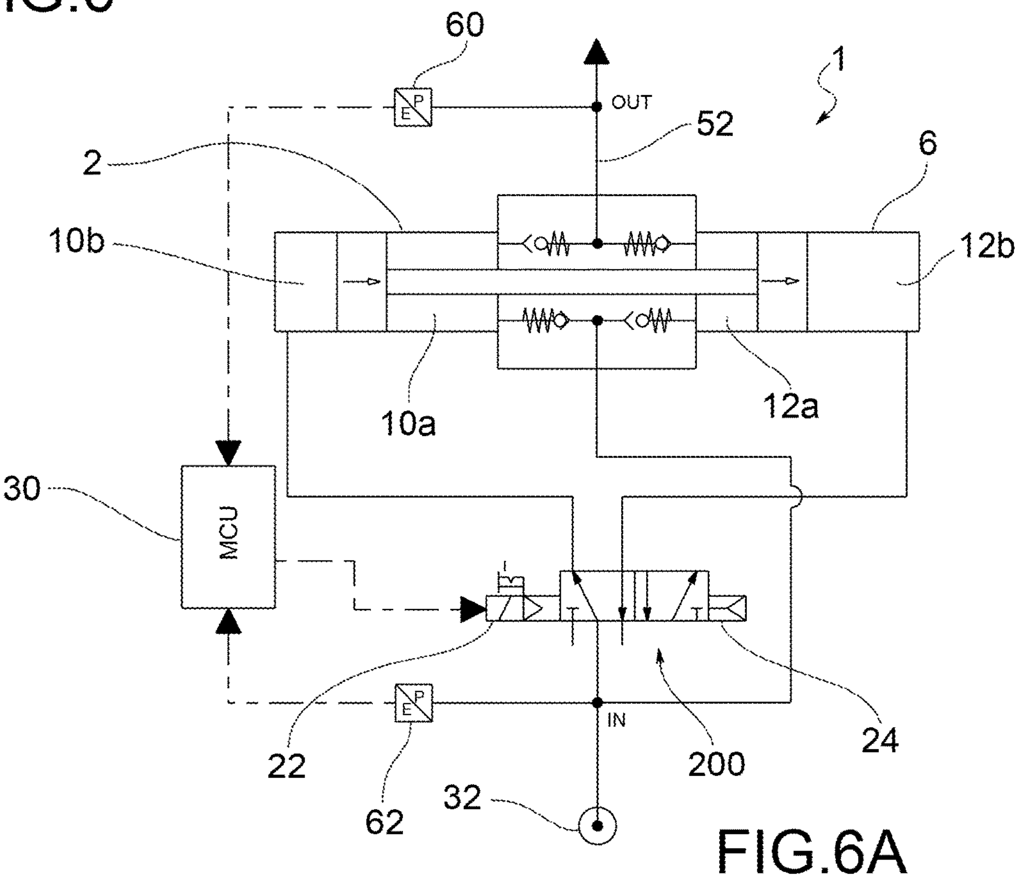

When the time interval corresponding to the piston switching frequency given by the compression curve has elapsed, the electronic control unit 30 emits a new switching signal to switch the configuration of the command device 20; 200 so as to reverse the direction of the motion of the pistons, in this case from left to right (FIG. 6, 6*a*). For example, the electronic control unit 30 activates the first pilot solenoid valve 22.

The fluid is supplied to the second pressure increase chamber 12*a* through the second supply passage 46*b*. In the first pressure increase chamber 10*a*, there is already pressurized fluid from the previous supply phase.

The command device 20; 200 supplies fluid to the first actuation chamber 10*b* through the first actuation passage 58*a*. Consequently, the pressure acts on the first piston 16 to push it from left to right.

Since the second pilot solenoid valve 24 (in the case of a bistable valve) has been de-energized, the command device 20; 200 discharges the second actuation chamber 12*b*. The pressurized fluid present in the second pressure increase chamber 12*a* may then push the second piston 18 in the left-to-right direction.

Consequently, the first piston 16, the piston rod 14, and the second piston 18 are integrally displaced in the left-to-right direction.

The fluid, after undergoing the pressure increase, is emitted to the outside through the first outlet passage 54*a* and the outlet port 52.

At the end of the time interval corresponding to the switching frequency given by the compression curve, the electronic control unit emits a new switching signal and the supply cycle of the pressure multiplier is inverted again.

Note that the above-described pressure multiplier allows the fluid pressure to be increased over a continuous pressure range between the initial pressure and a maximum pressure set by the geometry of the cylinder assembly.

When the pressure multiplier reaches the desired outlet pressure, as detected by the outlet pressure sensor, the electronic control unit stops operation of the cylinder assembly.

To the embodiments of the pressure multiplier according to the invention, in order to meet incidental needs, the person skilled in the art may make several changes, adjustments, adaptations, and replacements of elements with other functionally equivalent ones without departing from the scope of the following claims. Each of the features described as belonging to a possible embodiment may be obtained independently of the other described embodiments.

What is claimed is:

1. A pressure multiplier, comprising a cylinder assembly, a command device, and an electronic control unit, wherein the cylinder assembly comprises:
- a first chamber;
- a second chamber adjacent to the first chamber;
- a piston rod extending into the first chamber and the second chamber;
- a first piston connected to a first end of the piston rod inside the first chamber so as to divide the first chamber into a first pressure increase chamber, facing the second chamber, and a first actuation chamber, facing an opposite side with respect to the second chamber; and
- a second piston connected to a second end of the piston rod inside the second chamber, so as to divide the second chamber into a second pressure increase chamber, facing the first chamber, and a second actuation chamber, facing an opposite side with respect to the first chamber;
- wherein the command device is configured to:
  - supply with a pressurized fluid at least one of the first pressure increase chamber and the second pressure increase chamber;
  - alternately supply, based on a switching signal provided by the electronic control unit to the command device, the pressurized fluid to the first actuation chamber, while simultaneously discharging the pressurized fluid from the second actuation chamber, and the pressurized fluid to the second actuation chamber, while simultaneously discharging the pressurized fluid from the first actuation chamber; and
  - wherein the electronic control unit is configured to obtain the switching signal to be provided to the command device from a compression curve which, with pressure of the pressurized fluid entering the pressure multiplier being known, links the ratio between outlet pressure (Pout) of the pressurized fluid exiting the pressure multiplier and inlet pressure (Pin) of the pressurized fluid entering the pressure multiplier with a switching frequency of an axial translation direction of the first and second pistons of the cylinder assembly.

2. The pressure multiplier of claim 1, further comprising an outlet pressure sensor suitable to measure pressure of the pressurized fluid exiting the cylinder assembly and an inlet pressure sensor suitable to measure pressure of the pressurized fluid entering the cylinder assembly, said inlet and outlet pressure sensors being operatively connected to the electronic control unit.

3. The pressure multiplier of claim 1, wherein the command device is a spool valve, and wherein at least one switching of the spool valve is commanded by a pilot solenoid valve operatively connected to the electronic control unit.

4. The pressure multiplier of claim 1, wherein the compression curve is stored in a memory accessible by the electronic control unit.

5. The pressure multiplier of claim 1, wherein the pressure multiplier is devoid of mechanical limit switches or limit switch sensors suitable to cause reversal of a motion direction of the first and/or second pistons.

6. A method for multiplying a fluid pressure by a pressure multiplier comprising a cylinder assembly, a command device, and an electronic control unit, wherein the cylinder assembly comprises:
- a first chamber;
- a second chamber adjacent to the first chamber;
- a piston rod extending into the first chamber and the second chamber;
- a first piston connected to a first end of the piston rod inside the first chamber so as to divide the first chamber into a first pressure increase chamber, facing the second chamber, and a first actuation chamber, facing an opposite side with respect to the second chamber; and
- a second piston connected to a second end of the piston rod inside the second chamber, so as to divide the second chamber into a second pressure increase chamber, facing the first chamber, and a second actuation chamber, facing an opposite side with respect to the first chamber;
- wherein the command device is configured to:
  - supply with a pressurized fluid at least one of the first pressure increase chamber and the second pressure increase chamber;
  - alternately supply, based on a switching signal provided by the electronic control unit to the command device, the pressurized fluid to the first actuation chamber, while simultaneously discharging the pressurized fluid from the second actuation chamber, and the pressurized fluid to the second actuation chamber, while simultaneously discharging the pressurized fluid from the first actuation chamber; and
  - wherein the electronic control unit is configured to obtain the switching signal to be provided to the command device from a compression curve which, with pressure of the pressurized fluid entering the pressure multiplier being known, links the ratio between outlet pressure (Pout) of the pressurized fluid exiting the pressure multiplier and inlet pressure (Pin) of the pressurized fluid entering the pressure multiplier with a switching frequency of an axial translation direction of the first and second pistons of the cylinder assembly, the method comprising:

obtaining at least one compression curve which, with the pressure of the pressurized fluid entering the pressure multiplier being known, links the ratio between the outlet pressure (Pout) of the pressurized fluid exiting the pressure multiplier and the inlet pressure (Pin) of the pressurized fluid entering the pressure multiplier with the switching frequency of the axial translation direction of the first and second pistons of the cylinder assembly; and making the compression curve accessible for the electronic control unit.

7. The method of claim 6, wherein the compression curve is obtained through experimental tests performed on a pressure multiplier which is the same as that used to carry out multiplication of the fluid pressure.

8. The method of claim 6, wherein the compression curve is obtained through a digital fluid dynamics simulation based on a digital pressure multiplier model having the same physical and geometric features as the pressure multiplier used to carry out multiplication of the fluid pressure.

* * * * *